United States Patent
Kowles (10) Patent No.: US 10,983,911 B2
(45) Date of Patent: Apr. 20, 2021

(54) CAPACITY SWAPPING BASED ON COMPRESSION

(71) Applicant: Seagate Technology LLC, Longmont, CO (US)

(72) Inventor: Andrew M. Kowles, Lyons, CO (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 0 days.

(21) Appl. No.: 15/694,221

(22) Filed: Sep. 1, 2017

(65) Prior Publication Data

US 2019/0073306 A1 Mar. 7, 2019

(51) Int. Cl.
*G06F 12/0862* (2016.01)
*G06F 12/02* (2006.01)

(52) U.S. Cl.
CPC ...... *G06F 12/0862* (2013.01); *G06F 12/0246* (2013.01); *G06F 2212/401* (2013.01); *G06F 2212/6024* (2013.01); *G06F 2212/6028* (2013.01); *G06F 2212/7203* (2013.01)

(58) Field of Classification Search
CPC .......... G06F 12/0862; G06F 2212/401; G06F 2212/6024
See application file for complete search history.

(56) References Cited

U.S. PATENT DOCUMENTS

| | | | |
|---|---|---|---|
| 7,058,769 B1* | 6/2006 | Danilak | G11B 20/10 711/155 |
| 2003/0156473 A1* | 8/2003 | Sinclair et al. | G11C 7/00 365/200 |
| 2007/0005901 A1* | 1/2007 | Kellar | G06F 12/0862 711/137 |
| 2009/0112949 A1* | 4/2009 | Ergan | G06F 12/0802 |
| 2013/0194696 A1 | 8/2013 | Kitahara et al. | |
| 2013/0262767 A1* | 10/2013 | Lih | G06F 12/0897 711/120 |
| 2013/0290281 A1* | 10/2013 | Yokoi et al. | G06F 17/30 707/693 |
| 2014/0181369 A1* | 6/2014 | Horn | G06F 12/0246 711/103 |
| 2015/0301747 A1* | 10/2015 | Sokolov | G06F 3/0673 711/173 |
| 2017/0083253 A1 | 3/2017 | Kowles | |
| 2017/0090775 A1 | 3/2017 | Kowles | |
| 2017/0199707 A1 | 7/2017 | Varghese et al. | |

* cited by examiner

*Primary Examiner* — Jane Wei
(74) *Attorney, Agent, or Firm* — Westman, Champlin & Koehler, P.A.

(57) ABSTRACT

In one embodiment, a method is operable in an overprovisioned storage device comprising a cache region and a main storage region. The method includes compressing incoming data, generating a compression parameter for the compressed data, and storing at least a portion of the compressed data in chunks in the main storage region of the storage device. The method also includes predicting when to store other chunks of the compressed data in the cache region based on the compression parameter.

17 Claims, 6 Drawing Sheets

CAPACITY SWAPPING BASED ON COMPRESSION

SUMMARY

Embodiments described herein are operable with a storage device. In one embodiment, a method is operable in an over-provisioned storage device comprising a cache region and a main storage region. The method includes compressing incoming data, generating a compression parameter for the compressed data, and storing at least a portion of the compressed data in chunks in the main storage region of the storage device. The method also includes predicting when to store other chunks of the compressed data in the cache region based on the compression parameter and/or a history of compression parameters for ranges of logical addresses.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE DRAWINGS

Some embodiments are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody the principles of the embodiments. Furthermore, any examples described herein are intended to aid in understanding the principles of the embodiments and are to be construed as being without limitation to such specifically recited examples and conditions. As a result, this disclosure is not limited to the specific embodiments or examples described below.

Figure 1:
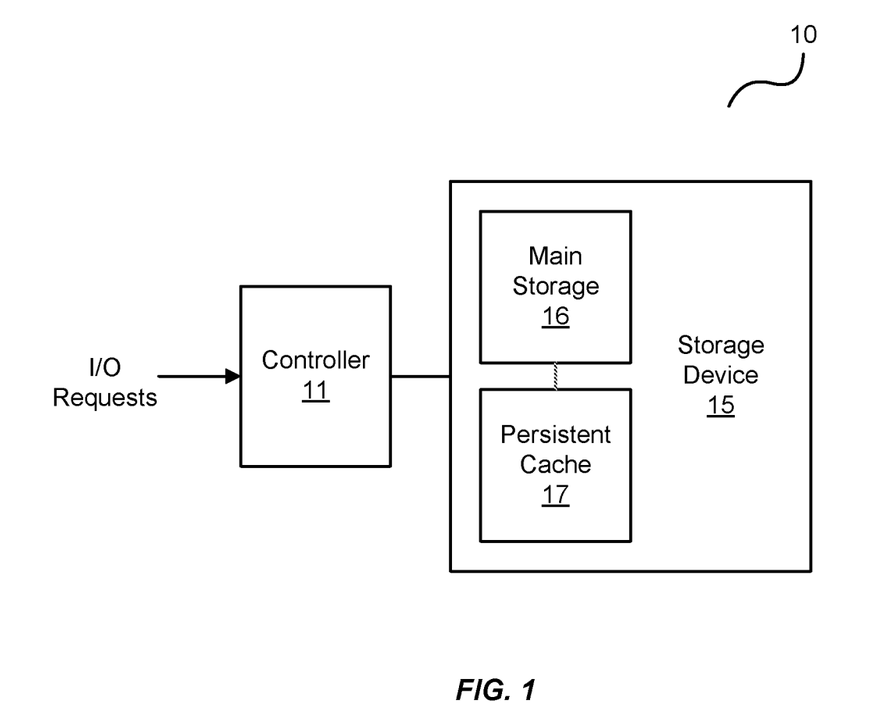
FIG. 1 is a block diagram of an exemplary storage system.

FIG. 1 is a block diagram of a storage system 10 comprising a controller 11 and a storage device 15. The storage device 15 can be implemented in a variety of types and sizes. For example, hard disk drives (HDDs) typically include one or more sliders configured with read and write heads. An actuator/suspension arm holds a slider above a magnetic disk. When the magnetic disk rotates, air flow generated by the rotation of the magnetic disk causes an air bearing surface (ABS) of the slider to fly at a particular height above the magnetic disk. As the slider flies on the ABS, the controller 11 directs a voice coil motor (VCM) to move the actuator/suspension arm to position the read and write heads over selected tracks of the magnetic disk to read data therefrom and write data thereto.

Other storage devices, such as Solid State Drives (SSDs), do not employ moving mechanical components like an HDD does. Instead, these storage devices use integrated circuitry as memory cells to persistently store data. The memory cells are arranged in "pages", which are arranged in "blocks". And, the blocks are arranged on a "plane" of a die. The controller 11 in such a case writes data resulting from Input/Output (I/O) requests to the pages of the blocks and manages how and where that data is stored and changed.

In whatever form, the controller 11 is any device, system, software, firmware, or combination thereof operable to process I/O requests (e.g., from a host system) to write data to and read data from the storage device 15. Examples of the storage device 15 include SSDs, resistive storage devices (e.g., Magnetic Tunnel Junctions and other spintronic structures), magnetic recording media, or various combinations thereof. The controller 11 is also operable to determine how and where the data is written to particular regions of the storage device 15. For example, the storage device 15 may be partitioned into a plurality of regions, including one or more main storage regions 16 and one or more nonvolatile cache regions 17 (e.g., persistent cache). The main storage region 16 may be used for storing the bulk of user data (e.g., data files, image data, video data, etc.). The cache region 17 may be used for storing metadata relating to those files and for storing instructions that, when executed by the controller 11, are operable to ensure performance of the storage device 15.

Generally, the persistent/nonvolatile cache region 17 of the storage device 15 is off-limits to a host system accessing the storage device 15 using conventional logical block addressing. And, for at least this reason, the storage capacity of the cache region 17 is not reported to the host system. Rather, the host system (or any other system accessing the storage device 15) "sees" the available capacity of the main storage region 16 of the storage device 15. The cache region 17 is, however, available to the controller 11 for any of a variety of reasons in addition to those mentioned above. For example, the controller 11 may use the cache region 17 as a scratchpad for operations prior to storing data within the main storage region 16. The cache region 17 may store executable instructions and/or data that, when processed by the controller 11, direct the controller 11 to improve performance of the storage device (e.g., by balancing I/O throughput, by improving latency response and quality of service, by managing the ability of the storage device 15 to absorb a burst of host activity quickly (batching), by mitigating "unfriendly" workloads and work amplification by the file system or host, or the like). This allocation of the cache region 17, as well as any other capacity not dedicated to the main storage region 16, is generally referred to as overprovisioning or overprovisioned media.

Alternatively or additionally, the controller 11 may use the cache region 17 as an alternate to the main storage region 16 when the main storage region 16 is full or about to be full. In other words, when the main storage region 16 is at or near its storage capacity limit, the controller 11 may use the cache region 17 to extend the storage capacity of the main storage region 16. However, as the storage capacity of the cache region 17 is infringed upon, certain performance features of the storage device 15 may be downgraded/disabled/unavailable/de-rated, for example, because there is less space to perform caching operations and/or to maintain performance-enhancing instructions for the storage device 15.

In some embodiments, the controller 11 also compresses some of the incoming data and stores it in the main storage region 16 of the storage device 15. For example, the controller 11 may compress user data (e.g., from a host system) using any of a variety of compression algorithms. The controller 11 may then store the compressed data in the main storage region 16 and retain compression parameters, pertaining to the compressed data, such as a compression ratio of the data (e.g., in the cache region 17, the main storage region 16, or a combination thereof). Based on the current compression parameters and/or a past history of compression parameters, the controller 11 can determine when to allocate space from the cache region 17 so as to control and/or reduce the impact on the performance of the storage device 15 as it becomes more and more fully utilized. An example of this process is shown and described in FIG. 2.

Figure 2:
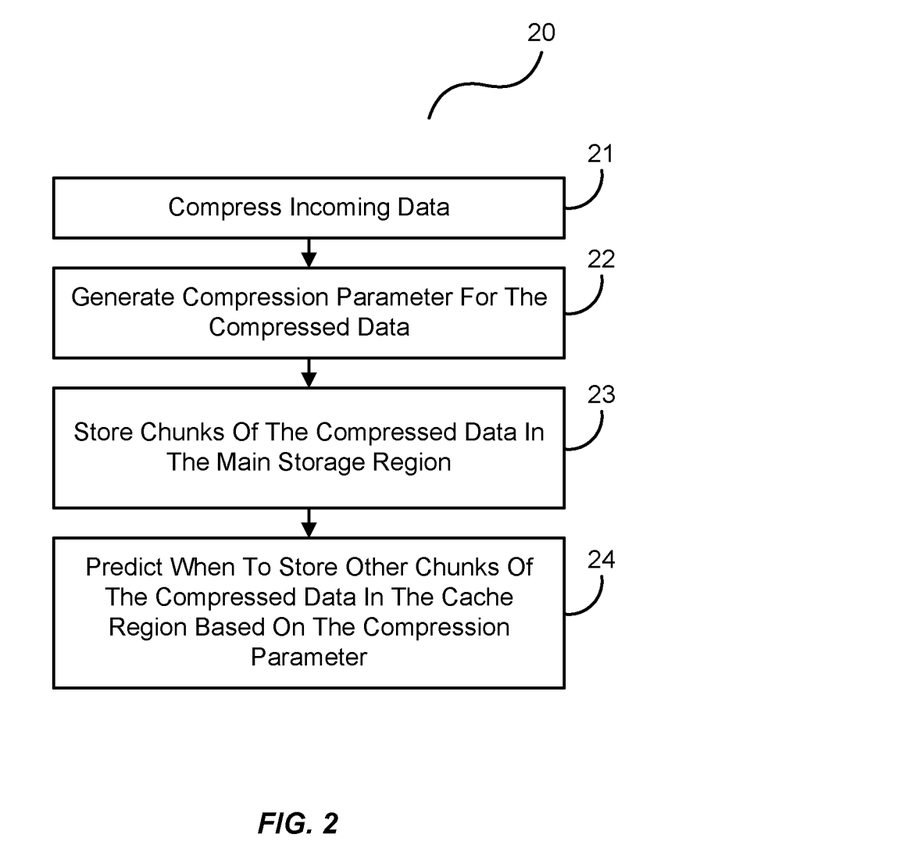
FIGS. 2-5 are flowcharts of exemplary processes operable with the storage system of FIG. 1.

FIG. 2 illustrates one exemplary process 20 operable with the storage system 10 of FIG. 1. In this embodiment, the controller 11 compresses certain incoming data, in the process element 21, and generates a compression parameter for the compressed data (e.g., the compression ratio of the compressed data), in the process element 22. The controller 11 stores chunks of the compressed data in the main storage region 16, in the process element 23. While capacity remains available in the main storage region 16, the controller 11 may continue storing chunks of the compressed data in the main storage region 16.

The controller 11 also predicts when to store other chunks of the compressed data in the cache region 17 based on the compression parameter, in the process element 24. For example, the controller 11 may determine the capacity remaining in the main storage region 16 and, based on the compression parameters of the data stored therein, the controller 11 may estimate how additional/subsequent data may be compressed. If the main storage region 16 is capable of storing additional compressed data based on this estimate, the controller 11 continues writing the compressed data to the main storage region 16. Otherwise, the controller 11 may allocate capacity from the cache region 17 and store other compressed data in chunks there.

The controller 11 may also store the compression parameter. For example, metadata relating to the compression parameter may be stored in-line with the stored chunks of compressed data and/or in some buffer (e.g., a Dynamic Random Access Memory "DRAM" backed by non-volatile media). This would allow the controller 11 continued use of compression parameters for, among other things, subsequent predictions regarding when to store subsequent chunks of compressed data in the cache region 17 (e.g., based on an historical analysis of the compression parameters). In one embodiment, compression and decompression is implemented in hardware and is performed in "real-time" without consuming additional processor cycles.

Figure 3:
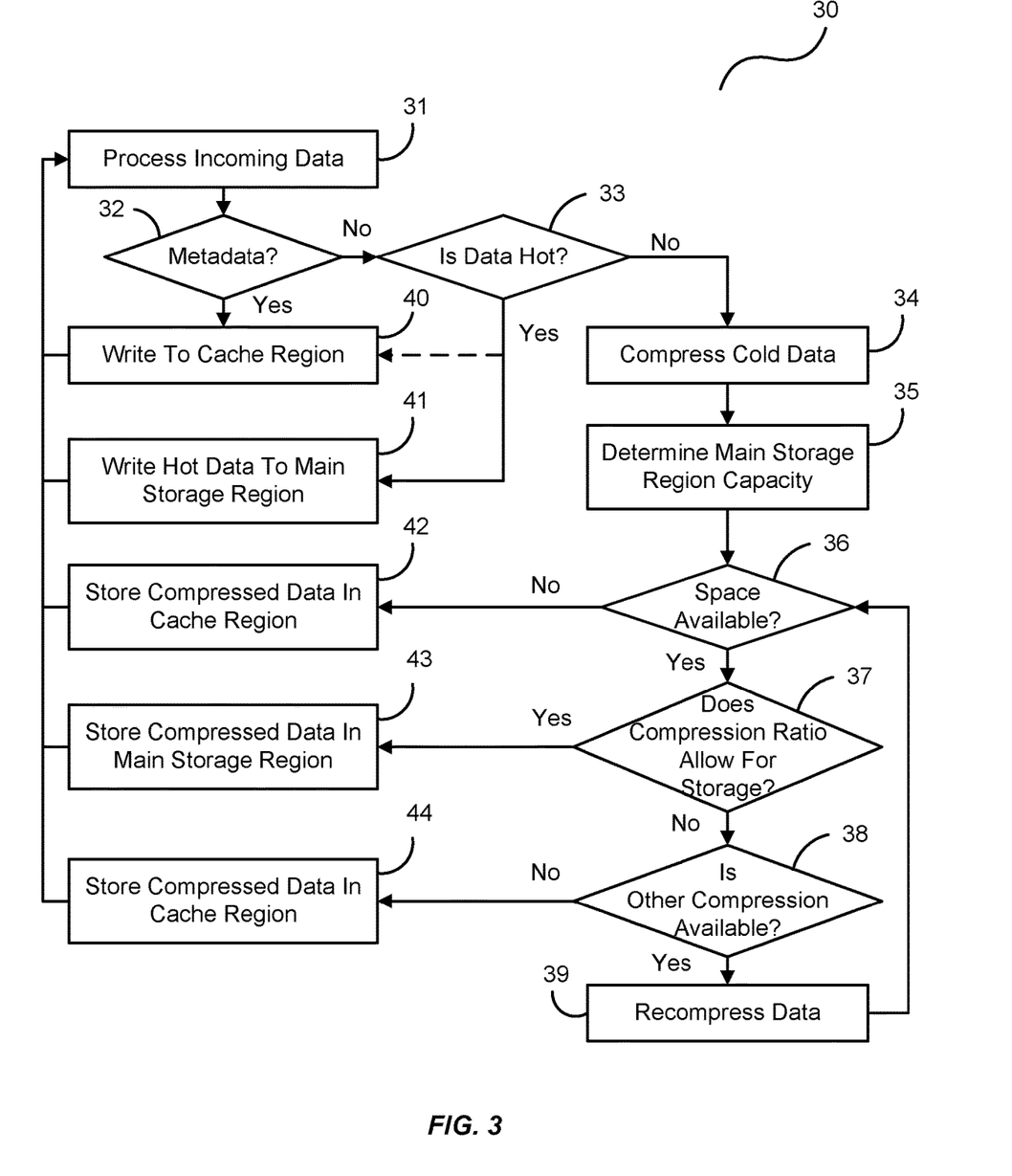

FIG. 3 is another exemplary process 30 of the storage system 10 of FIG. 1 illustrating a more detailed manner in which the controller 11 may store data and allocate space within the cache region 17. In this embodiment, the controller 11 initiates by processing incoming data (e.g., from I/O requests), in the process element 31. From there, the controller 11 may determine whether the data is metadata associated with user files in the main storage region 16, in the process element 32. If so, the controller 11 may write the metadata to the cache region 17, in the process element 40, and resume processing of incoming data, in the process element 31.

If the incoming data is not metadata, the controller 11 may determine whether the data is "hot", in the process element 33. For example, the controller 11 may determine a frequency at which the data is being used and/or modified in the main storage region 16 (e.g., a usage factor). If the data is frequently used, the controller 11 may label the data as being hot. The controller 11 may write the hot data to the main storage region 16, in the process element 41, so long as capacity exists there. Alternatively or additionally, the controller 11 may choose to write hot data to the cache region 17 as it is generally faster to write to the cache region than the main storage region 16. From there, the controller 11 resumes processing of incoming data, in the process element 31.

If the incoming data is "cold" (meaning that it is not as frequently used and/or modified), the controller 11 compresses the cold data, in the process element 34. The controller 11 may then determine the remaining capacity of the main storage region 16, in the process element 35. If no space is available (e.g., the process element 36), then the controller 11 may allocate capacity from the cache region 17 and store the compressed data therein, in the process element 42. From there, the controller continues processing incoming data, in the process element 31.

If, however, space is available (e.g., the process element 36), then the controller 11 may determine whether the compression ratio of the incoming cold data allows for storage in the main storage region 16, in the process element 37. Generally, a data compression ratio quantifies the reduction in a data representation size produced by a data compression algorithm. To illustrate, if 10 Mbytes remain available in the main storage region 16 and the controller 11 compresses 20 Mbytes of data to a compression ratio of "5", then the controller 11 determines that the amount of compressed data is 4 Mbytes and the controller 11 would store the compressed data in the main storage region 16, in the process element 43.

If the compression ratio does not allow for storage of the compressed data, the controller 11 may determine whether other compression algorithms are available, in the process element 38. For example, the controller 11 may determine whether a higher form of compression may exist. If so, the controller 11 may recompress the data, in the process element 39, and return to determining whether there is available space in the main storage region 16, in the process element 36.

If no other compression algorithm exists, then the controller 11 may allocate capacity from the cache region 17 and store the compressed data therein, in the process element 44, in a manner similar to the process element 42. The controller 11 may then resume processing of incoming data, in the process element 31. It should be noted that the above embodiment is not intended to be limiting. For example, one reason why hot data would not be compressed would be due to a performance degradation. To illustrate, assume the controller 11 receives a request to write 256 kB of data, which the controller 11 then compresses to 128 kB. Then, if the controller 11 receives a request to read 4 kB of that original 256 kB of data, the controller 11 would need to decompress the 128 kB to recover that 4 kB of data. This is an uncommon scenario, however, as such intervening read requests are not normal. Thus, hot data may be compressed/decompressed as well.

Metadata may also be relatively hot and the controller 11 may use the relative heat to determine whether incoming data is metadata. For example, metadata may be detected in part because of the low entropy found in the associated incoming data. Other ways to detect metadata include Logical Block Address (LBA) addressing patterns.

Figure 4:
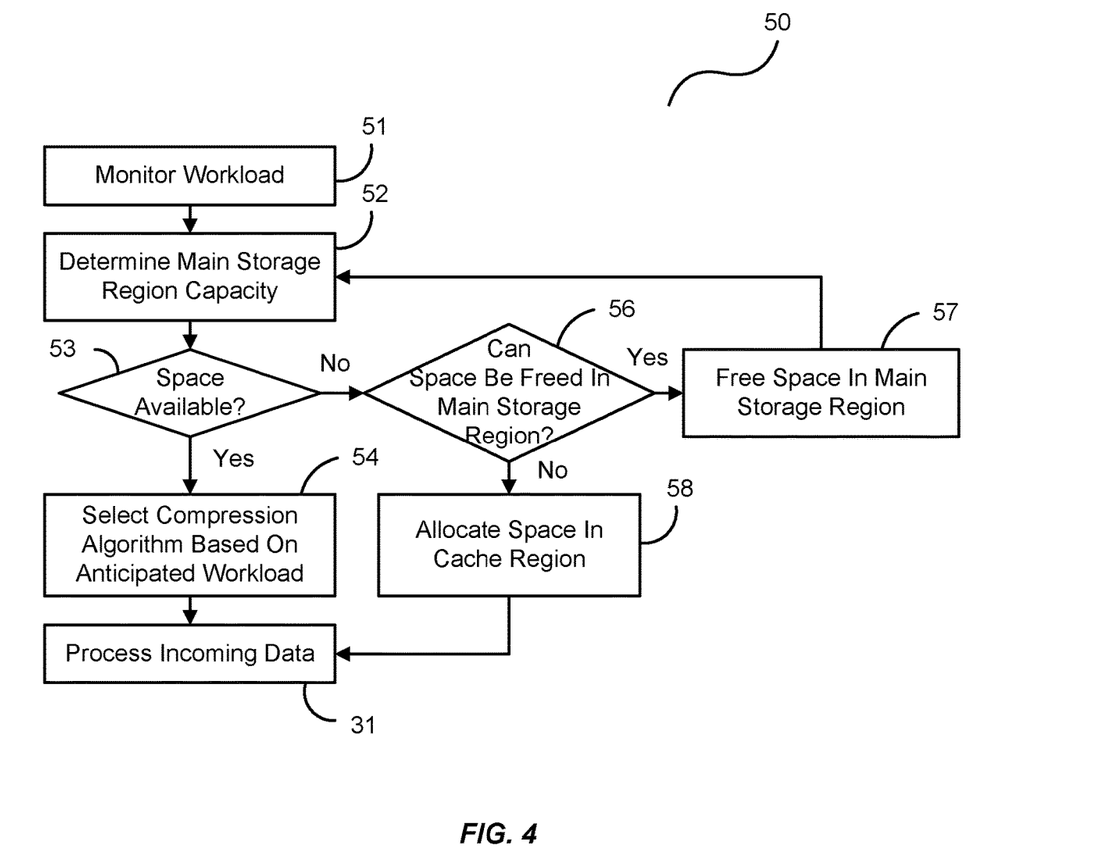

FIG. 4 illustrates another exemplary process 50 of the storage system 10 of FIG. 1. In this embodiment, the controller 11 monitors the workload of the storage device 15, in the process element 51. For example, the storage device 15 may experience a greater number of I/O requests depending on the time of day and/or the I/Os may be positively correlated with certain LBA ranges. The controller 11 may use this information to determine how and when to compress incoming data.

In this regard, the controller 11 may determine the storage capacity of the main storage region 16, in the process element 52. If space is available in the main storage region 16 (e.g., the process element 53), then the controller 11 may select a compression algorithm having a compression ratio that meets or exceeds the needs of the anticipated workload, in the process element 54. The controller 11 may then return to the process element 31 (e.g., as illustrated in FIG. 3) to resume processing of the incoming data.

If no space is available in the main storage region 16 of the storage device 15 (e.g., the process element 53), then the controller 11 may determine whether space can be freed from the main storage region 16, in the process element 56, via compaction of empty space in a process colloquially known as "garbage collection". For example, in an SSD embodiment, data may be written to pages of the SSD. But, when that data is changed, it is written to another page. The previously written data is then marked invalid, but it cannot be erased until the entire block containing the page is erased, a process generally referred to as garbage collection. In this regard, the controller 11 may determine whether garbage collection, or some other capacity freeing process, can free up space within the storage device 15. If so, the controller 11 frees that space in the main storage region 16 and returns to determine the available capacity of the main storage region 16, in the process element 57.

If no space can be freed, then the controller 11 may allocate space in the cache region 17, in the process element 56, and resume processing of incoming data, in the process element 31 (e.g., as illustrated in FIG. 3).

Figure 5:
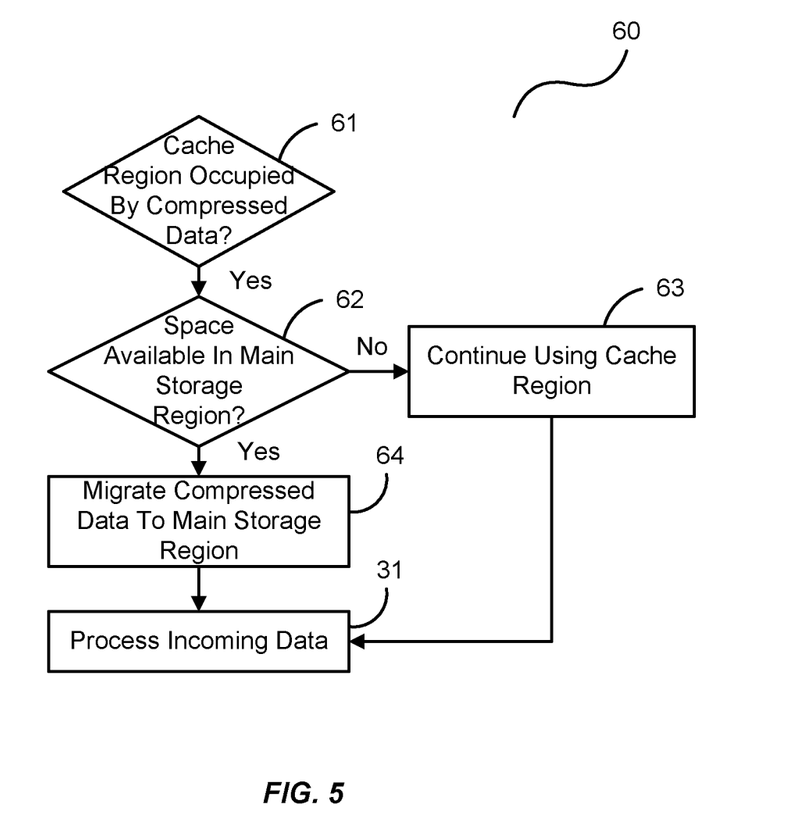

FIG. 5 illustrates yet another exemplary process 60 of the storage system 10 of FIG. 1. In this embodiment, it is presumed that the controller 11 has already allocated space in the cache region 17 (e.g., to compressed user data), in the process element 61. Thus, to improve performance of the storage device 15, the controller 11 may seek to rededicate the allocated storage space to the main storage region 16. In this regard, the controller 11 may determine whether space is available in the main storage region 16, in the process element 62. If no space is available in the main storage region 16 and/or no space in the main storage region 16 can be freed, then the controller continues using the cache region 17, in the process element 63, and resumes processing of incoming data, in the process element 31 (e.g., as illustrated in FIG. 3).

If space is available in the main storage region 16, then the controller 11 may migrate compressed data to the main storage region 16, in the process element 64, and continue processing the incoming data, in the process element 31 (e.g., as illustrated in FIG. 3).

It should be noted that the process embodiments herein are exemplary and not intended to be limiting. The process elements thereof may be rearranged or changed while still embodying the principles of dynamic space allocation of an over-provisioned storage device disclosed herein. Additionally, the various processes described herein may be combined in a variety of ways as a matter of design choice. Moreover, the embodiments herein are not intended to be limited to any particular form of compression, compression analysis, and/or allocation of storage space between the main storage region 16 and the cache region 17 of an over-provisioned storage device. For example, some forms of compression and compression analysis that may find use in the embodiments herein are shown and described in U.S. patent application Ser. No. 14/865,487 (filed Sep. 25, 2015), the contents of which are incorporated herein by reference. Additionally, examples of over provisioning that may find use in the embodiments herein are shown and described in U.S. patent application Ser. No. 15/366,389 (filed Dec. 1, 2016) and Ser. No. 14/255,819 (filed Apr. 17, 2014), the contents of each of which are also incorporated herein by reference.

Figure 6:
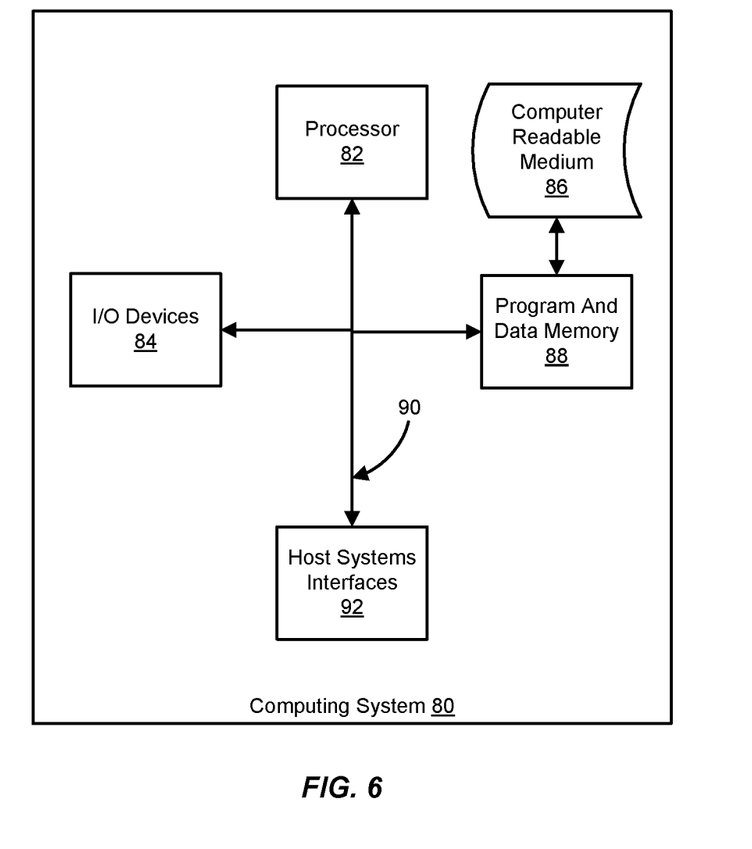
FIG. 6 illustrates a computing system in which a computer readable medium may provide instructions for performing methods disclosed herein.

It should also be noted that the embodiments herein can take the form of hardware, software, or a combination thereof. For example, one software embodiment may include, but is not limited to, firmware, resident software, microcode, etc. FIG. 6 illustrates a computing system 80 in which a computer readable medium 86 may provide instructions for performing any of the methods disclosed herein.

Furthermore, the embodiments can take the form of a computer program product accessible from the computer readable medium 86 providing program code for use by or in connection with a computer or any instruction execution system. For the purposes of this description, the computer readable medium 86 can be any apparatus that can tangibly store the program for use by or in connection with the instruction execution system, apparatus, or device, including the computer system 80.

The medium 86 can be any tangible electronic, magnetic, optical, electromagnetic, infrared, or semiconductor system (or apparatus or device). Examples of a computer readable medium 86 include a semiconductor or solid state memory, magnetic tape, a removable computer diskette, a random access memory (RAM), a read-only memory (ROM), a magnetic disk, and an optical disk. Some examples of optical disks include compact disk read only memory (CD-ROM), compact disk—read/write (CD-R/W) and Digital Versatile Disk (DVD).

The computing system 80, suitable for storing and/or executing program code, can include one or more processors 82 coupled directly or indirectly to memory 88 through a system bus 90. The memory 88 can include local memory employed during actual execution of the program code, bulk storage, and cache memories which provide temporary storage of at least some program code in order to reduce the number of times code is retrieved from bulk storage during execution. I/O devices 84 (including but not limited to keyboards, displays, pointing devices, etc.) can be coupled to the system either directly or through intervening I/O controllers. Network adapters may also be coupled to the system to enable the computing system 80 to become coupled to other data processing systems, such as through host systems interfaces 92, or remote printers or storage devices through intervening private or public networks. Modems, cable modem and Ethernet cards are just a few of the currently available types of network adapters.

I claim:

1. A method comprising:

in an over-provisioned storage device comprising a non-volatile cache region and a main storage region, compressing first incoming data by a controller of the storage device to obtain first compressed data;

generating a compression parameter for the first compressed data;

storing the first compressed data in first chunks in the main storage region of the over-provisioned storage device;

predicting when to store at least a portion of second incoming data different from the first incoming data in second chunks of second compressed data in the non-volatile cache region by estimating how the second incoming data may be compressed based in part on the generated compression parameter for the first compressed data;
allocating storage capacity in the nonvolatile cache region according the prediction; and
storing the second chunks of the second compressed data in the nonvolatile cache region when the second chunks exceed a capacity of the main storage region.

2. The method of claim 1, further comprising:
deleting some of the first chunks of the first compressed data from the main storage region; and
writing the second chunks of the second compressed data to the main storage region from the nonvolatile cache region in response to deleting.

3. The method of claim 1, further comprising:
writing uncompressed data to the nonvolatile cache region, wherein said uncompressed data includes: metadata of the first chunks of the first compressed data; metadata of the second chunks of the second compressed data; the compression parameter; or a combination thereof.

4. The method of claim 1, further comprising:
storing uncompressed data in the main storage region based on a usage factor of the uncompressed data.

5. The method of claim 1, wherein the over-provisioned storage device comprises:
a rotating magnetic storage device; a solid state storage device; a magnetic storage device; a resistive storage device, or a combination thereof.

6. The method of claim 1, further comprising:
storing executable instructions in the nonvolatile cache region, wherein the executable instructions direct a controller of the over-provisioned storage device to optimize performance of the storage device.

7. A non-transitory computer readable medium comprising instructions that, when executed by a controller, direct the controller to:
in an over-provisioned storage device comprising a cache region and a main storage region,
compress first incoming data to obtain first compressed data;
generate a compression parameter for the first compressed data;
store the first compressed data in first chunks in the main storage region of the over-provisioned storage device;
predict when to store at least a portion of second incoming data different from the first incoming data in second chunks of second compressed data in the cache region by estimating how the second incoming data may be compressed based on the compression parameter for the first compressed data;
allocate storage capacity in the cache region according the prediction; and
store the second chunks of the second compressed data in the cache region when the second chunks exceed the main storage region.

8. The computer readable medium of claim 7, further comprising instructions that direct the controller to:
delete some of the first chunks of the first compressed data from the main storage region; and
write the second chunks of the second compressed data to the main storage region from the cache region in response to deleting.

9. The computer readable medium of claim 7, further comprising instructions that direct the controller to:
write uncompressed data to the cache region, wherein said uncompressed data includes: metadata of the first chunks of the first compressed data; metadata of the second chunks of the second compressed data; the compression parameter; or a combination thereof.

10. The computer readable medium of claim 7, further comprising instructions that direct the controller to:
store uncompressed data in the main storage region based on a usage factor of the uncompressed data.

11. The computer readable medium of claim 7, wherein the over-provisioned storage device comprises:
a solid state storage device; a magnetic storage device; a resistive storage device; or a combination thereof.

12. The computer readable medium of claim 7, further comprising instructions, in the cache region, that direct the controller to:
optimize performance of the over-provisioned storage device.

13. A storage system, comprising:
an over-provisioned storage device having a cache region and a main storage region; and
a controller operable to compress first incoming data to obtain first compressed data, to generate a compression parameter for the first compressed data, to store the first compressed data in first chunks in the main storage region of the over-provisioned storage device, to predict when to store at least a portion of second incoming data different from first incoming data in second chunks of second compressed data in the cache region by estimating how the second incoming data may be compressed based on the compression parameter for the first compressed data, to allocate storage capacity in the cache region according the prediction, and to store the second chunks of the second compressed data in the cache region when the second chunks exceed the main storage region.

14. The storage system of claim 13, wherein:
the controller is further operable to delete some of the first chunks of the first compressed data from the main storage region, and to write the second chunks of the second compressed data to the main storage region from the cache region in response to deleting.

15. The storage system of claim 13, wherein:
the controller is further operable to write uncompressed data to the cache region, wherein said uncompressed data includes: metadata of the first chunks of the first compressed data; metadata of the second chunks of the second compressed data; the compression parameter; or a combination thereof.

16. The storage system of claim 13, wherein:
the controller is further operable to store uncompressed data in the main storage region based on a usage factor of the uncompressed data.

17. The storage system of claim 13, wherein:
the controller is further operable to process instructions in the cache region that direct the controller to optimize performance of the over-provisioned storage device.

* * * * *